United States Patent
Katsuma

(10) Patent No.: US 6,552,851 B2
(45) Date of Patent: Apr. 22, 2003

(54) ACHROMATIC BEAM SHAPING PRISM

(75) Inventor: Toshiaki Katsuma, Tokyo (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/905,100

(22) Filed: Jul. 16, 2001

(65) Prior Publication Data

US 2002/0024733 A1 Feb. 28, 2002

(30) Foreign Application Priority Data

Aug. 24, 2000 (JP) ........................................ 2000-253302

(51) Int. Cl.[7] .................................................. G02B 5/18
(52) U.S. Cl. ........................................ 359/569; 359/837
(58) Field of Search .............................. 359/615, 669, 359/566, 837, 569

(56) References Cited

U.S. PATENT DOCUMENTS 5,101,458 A    3/1992   Spaulding et al.
5,625,499 A  * 4/1997   Chen ........................... 359/831
5,652,681 A  * 7/1997   Chen et al.

FOREIGN PATENT DOCUMENTS

JP    10-62611    3/1998
JP    10-268112   10/1998

* cited by examiner

Primary Examiner—Mark A. Robinson
Assistant Examiner—Alessandro V. Amari
(74) Attorney, Agent, or Firm—Arnold International; Bruce Y. Arnold

(57) ABSTRACT

An achromatic beam shaping prism is disclosed which compensates for a fluctuation in oscillating wavelength of a semiconductor laser source of a recording type optical disc system using a single prism having a diffraction grating with a specified pitch so as to make the beam shaping prism achromatic. Two equations are given for specifying the pitch d or d' of the diffraction grating, depending on whether the diffraction grating is applied to the output surface or the input surface of the prism, respectively.

1 Claim, 4 Drawing Sheets

ACHROMATIC BEAM SHAPING PRISM

BACKGROUND OF THE INVENTION

In an optical disc recording system, the equalization of intensity distribution (hereinafter termed "beam shaping") of a laser beam that is output from a semiconductor laser source is desired in order to optimize the shape of a light spot on a disc. For example, beam shaping prisms may be used to either compress or expand the diameter of an incident beam in a specific direction by refracting the beam. Specific examples of such beam shaping prisms are disclosed in Japanese Laid Open Applications H10-268112 and H10-62611. All of these beam shaping prisms are designed so that they not only perform beam shaping, but also can compensate for recording performance degradation caused by wavelength fluctuations of a semiconductor laser that is used to read the optical disc.

Wavelength fluctuations of a semiconductor laser frequently occur at the start of operation of a laser or when the luminous power of the laser is changed. Such wavelength fluctuations are said to be an unavoidable phenomenon in an optical disc system for recording signals on a disc medium when turning the laser ON/OFF. However, in the case where the output of a laser fluctuates from a reference wavelength, the output beam from a beam shaping prism will be emitted at a slightly different inclination as compared with the output beam at the reference wavelength, due to the index of refraction of the beam shaping prism being dependent on wavelength. For a recording-type optical disc system, this becomes a problem in that the position of a reading light spot that is formed on a disc will vary with a change in wavelength. This will cause signal degradation in recording onto a disc as well as in reading from a disc using a photo head.

In the above conventional examples, this problem is solved by using two prisms which are formed of materials that have different, refractive indexes and different dispersions. Thus, by using a pair of prisms that form an achromatic beam shaping system, the angle of an output beam is kept roughly constant so as to prevent a positional fluctuation of a light spot on a disc even when the wavelength of the incident beam fluctuates. Further, a beam shaping optical system that uses two cylindrical lenses in lieu of a pair of prisms has also been known.

An optical system is disclosed in U.S. Pat. No. 5,101,458 which enables the output direction of a beam emitted from a prism to be made substantially constant when the wavelength of an input light beam and the incident angle thereof vary. The technique disclosed in this patent leads light that is output from a waveguide into a prism arranged opposite to the waveguide. The output direction of this light is made constant for a change in wavelength by the action of a diffraction grating formed on the output face of the prism. However, the invention described in the above prior art patent employs both a waveguide and a prism, wherein the prism requires a change of the angle of incidence of the input beam to the prism. Therefore the basic idea of that invention is different from that of the present invention. In the present invention the angle of incidence of the input beam is constant and no waveguide path is needed as a necessary component.

BRIEF SUMMARY OF THE INVENTION

The object of the present invention is to provide an achromatic beam shaping prism in which the output angle of an emitted beam remains substantially the same even when the wavelength of the incident beam changes and which uses a construction that enables both miniaturization and low cost.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

This invention relates to a beam shaping prism which compresses or extends the cross-section of an incident beam in a specific direction. More particularly, this invention is directed to an achromatic beam shaping prism which can maintain the angle of an output beam constant even as the wavelength of a light source, such as a semiconductor laser and the like, fluctuates. The demand for low cost and miniaturization of components is strong for achromatic beam shaping systems. Because plural beam shaping prisms are used in all of the above-mentioned, conventional beam shaping systems, the cost of such systems is highly dependent on the cost of the beam shaping prisms. Likewise, miniaturization of the beam shaping system is highly dependent on the size of the beam shaping prism.

The achromatic beam shaping prism of the present invention converts a beam that is incident onto an input plane of the prism by expanding or compressing the cross-section of the input beam by a given factor in a specific direction so as to shape the cross-section of an output beam from an exit plane of the prism. The achromatic beam shaping prism of a first species of the present invention is formed of a single prism that includes a diffraction grating formed on an output surface thereof that satisfies the following Equation (1):

$$\frac{d\{n_{\lambda,1} \sin\{\sin^{-1}(\sin\theta_1/n_{\lambda,1})-\alpha\} - n_{\lambda,2} \sin\{\sin^{-1}(\sin\theta_1/n_{\lambda,2})-\alpha\}\}}{\lambda_1-\lambda_2} = \quad \text{Equation (1)}$$

where d is the pitch of the diffraction grating at the output surface of the prism, $n_{\lambda,1}$ is the index of refraction of the prism material at wavelength $\lambda_1$, $\theta_1$ is the angle the incident beam makes with the line that is normal to the input surface of the prism, α is the apex angle of the prism, $n_{\lambda 2}$ is the index of refraction of the prism material at wavelength $\lambda_2$, $\lambda_1$ is the reference wavelength of the incident beam, and $\lambda_2$ is the wavelength of the incident beam after the change in wavelength of the light source from the reference wavelength.

Figure 1A:
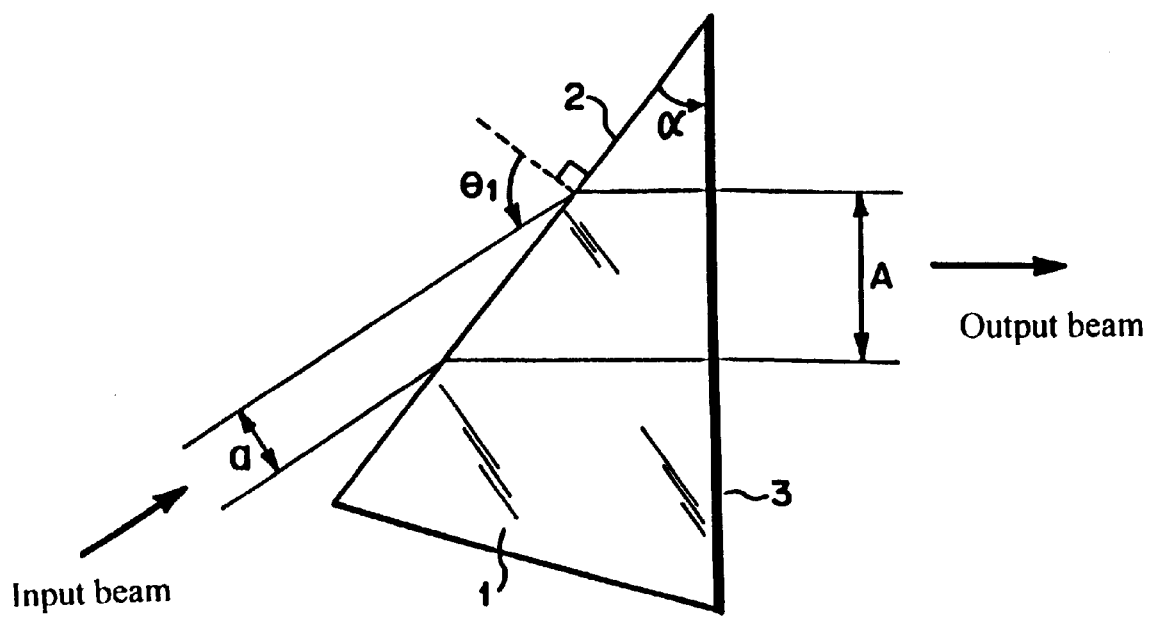
FIG. 1A is a side view of an achromatic beam shaping prism according to a first species of Embodiment 1, wherein a diffraction grating is applied to the output surface of the prism in order to make the prism achromatic.
Figure 1B:
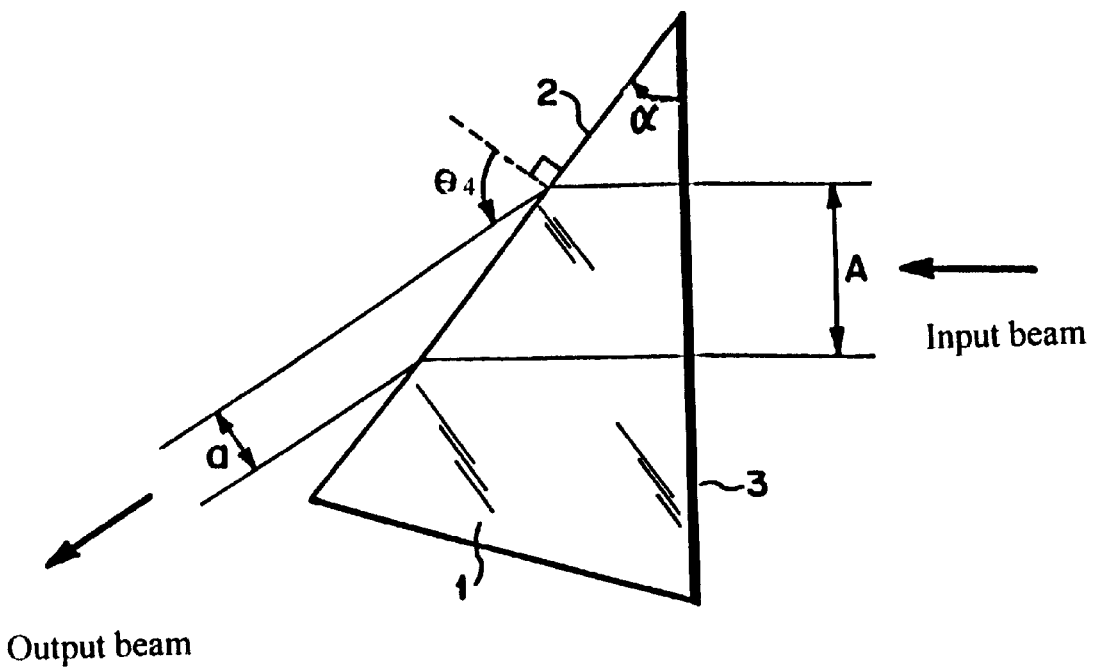
FIG. 1B is a side view of a second species of Embodiment 1, which is designed to have a diffraction grating applied to the input surface of the beam shaping prism rather than the output surface of the beam shaping prism so as to make the beam shaping prism achromatic.

The achromatic beam shaping prism of the invention converts the cross-section of a beam that is incident onto a surface by expanding it or compressing it by a given factor in a specific direction. Instead of having a diffraction grating on its output surface, as illustrated in FIG. 1A, that satisfies the above Equation (1), the achromatic beam shaping prism of the invention may instead have a diffraction grating on its input surface, as illustrated in FIG. 1B, that satisfies the following Equation (2):

$$d'[n_{\lambda 2} \sin\{\sin^{-1}(\sin \theta_4/n_{\lambda 2})+\alpha\} - n_{\lambda 1} \sin\{\sin^{-1}(\sin \theta_4/n_{\lambda 1})+\alpha\}] = \lambda_1 - \lambda_2 \quad \text{Equation (2)}$$

where d' is the pitch of the diffraction grating at the input surface of the prism, $\theta_4$ is the angle the output beam makes with the line that is normal to the output surface of the prism, and $n_{\lambda 2}$, α, $n_{\lambda 1}$, $\lambda_1$ and $\lambda_2$ are as previously defined.

Moreover, when the point of intersection of the optical axis of an incident beam with an input plane or the point of intersection of the optical axis of an output beam with an output plane (the input plane and output plane will each hereinafter be termed a "boundary surface") are taken as rotation centers and the normal to the boundary surface at the point of intersection is rotated so that it overlaps with the optical axis of the beam, the above angle of the incident beam and the above angle of the output beam are taken as positive if the rotation direction is counterclockwise. Furthermore, the apex angle α of the prism represents an angle made by the input plane and the output plane of the prism. If the line where the two planes cross is taken as a rotation axis, the apex angle α is taken as positive if the input plane is rotated counterclockwise in order to align it with the output plane.

The invention will be described in general terms with reference to FIG. 1A, which although specifically illustrating only one embodiment of the invention is fairly well representative of the other embodiments of the invention as well.

FIG. 1A shows a side view of an achromatic beam shaping prism 1 according to a first species of Embodiment 1. The achromatic beam shaping prism 1 is formed of a single triangular prism having an input surface 2 and an output surface 3 with the apex angle between these two planar surfaces being α degrees, as illustrated. Moreover, a diffraction grating having a pitch d specified by the above Equation (1) is formed on the output surface 3. In FIG. 1A, the light rays of the incident beam have been made substantially parallel with one another by forming the incident beam using a semiconductor laser source equipped with a collimator lens.

As shown in FIG. 1A, this achromatic beam shaping prism 1 has a beam shaping function which converts the cross-section of a beam incident onto an input surface by expanding it by a given conversion factor in a specific direction so that the cross-section is different at the output surface. This is accomplished by having the input beam be incident at a steep inclination angle to the boundary surface. Thus, in FIG. 1A, the cross-section in a direction perpendicular to the direction of propagation of the incident beam is enlarged from "a" to - - -A—, where A is the beam cross-section in a direction perpendicular to the propagation direction of the output beam. If the conversion factor is taken as the beam shaping factor β, then A=βa. On the other hand, in the plane (not illustrated) that is perpendicular to the surface of paper, the beam cross-section "a" in a direction perpendicular to the propagation direction of the incident beam remains unchanged as the beam is transmitted through the prism 1.

Moreover, the present invention provides a beam shaping function not only in the case where the angle of incidence (as measured from the surface normal of the input surface 2) takes a relatively large value (as shown in FIG. 1A), but also in the case where the output angle (as measured from the surface normal of the output surface 3) takes a relatively large value (not illustrated).

Furthermore, by providing a diffraction grating on the output surface having a pitch d which satisfies Equation 1, the output angle of the emitted beam can be made to remain substantially constant even when the wavelength of the incident beam fluctuates. Equation (1) specifies a pitch d of a diffraction grating on the output surface which makes the output angle substantially constant even though the wavelength of the beam that is incident the input surface of the prism changes from the reference wavelength $\lambda_1$ to a wavelength $\lambda_2$. Thus, the diffraction grating makes the prism achromatic in its refraction of an incident beam. If, instead of having a diffraction grating applied to the output surface, it is desired to have a diffraction grating applied to an input surface of the prism (as shown in FIG. 1B) so as to make the prism achromatic, a diffraction grating having a pitch d' is required, where d' satisfies Equation (2).

Figure 2A:
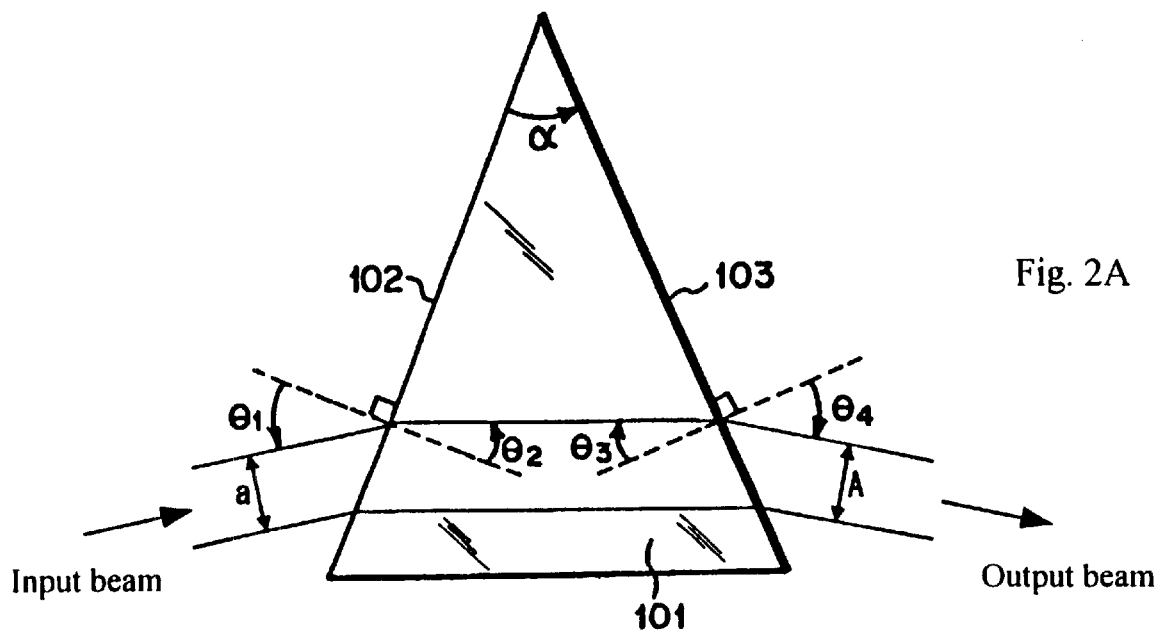
FIGS. 2A and 2B are side views of common triangular prisms having a diffraction grating formed on their output surfaces, for illustrating various angles used in Equation (1) and Equation (2)
Figure 2B:
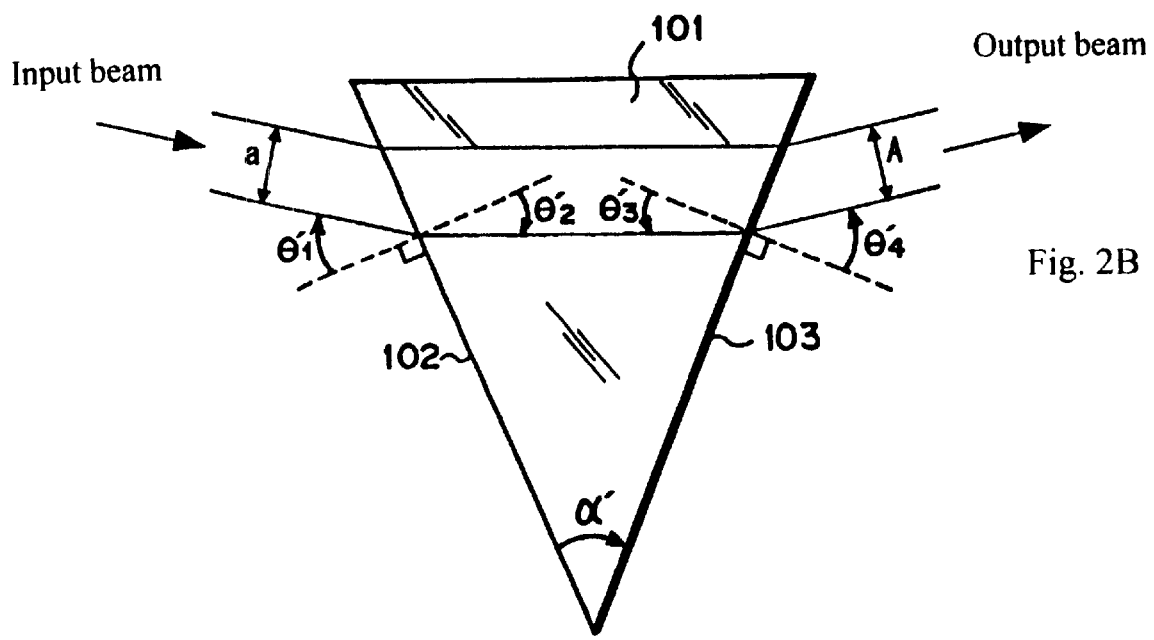

FIGS. 2A and 2B are modal diagrams of a substantially collimated beam transiting the prism 101. In FIG. 2A, $\theta_1$ is the incidence angle when a beam is incident onto input surface 102 of the prism 101, $\theta_2$ is the angle of refraction of the beam at the input surface 102, $\theta_3$ is the angle of incidence of the refracted beam within the prism onto the output surface 103 of the prism 101, $\theta_4$ is the angle that the output beam makes with the surface normal to output surface 103, and α is the apex angle of the prism, i.e., the angle between the input surface 102 and the output surface 103 of the prism 101.

In FIG. 2B, the prism 101 has been rotated 180° so that its apex points downward. Whereas the angles $\theta_1$, $\theta_2$, and α of FIG. 2A are positive, the angles $\theta'_1$, $\theta'_2$, and α' of FIG. 2B are negative. And, whereas the angles $\theta_3$, $\theta_4$ of FIG. 2A are negative, the angles $\theta'_3$, $\theta'_4$ are positive.

Equation (1) specifies the pitch d of a diffraction grating at the output surface which will make the beam shaping prism 1 achromatic.

The following Equations (3)-(5) assume that the incident beam has a reference wavelength $\lambda_1$:

$$\sin \theta_1 = n_{\lambda 1} \sin \theta_{2\lambda 1} \quad \text{Equation (3)}$$

$$\theta_{3\lambda 1} = \theta_{2\lambda 1} - \alpha \quad \text{Equation (4)}$$

$$d(n_{\lambda 1} \sin \theta_{3\lambda 1} - \sin \theta_{4\lambda 1}) = \lambda_1 \quad \text{Equation (5)}$$

where $\theta_{2\lambda 1}$ is the angle of refraction, as measured from the input surface normal, of a beam at the reference wavelength $\lambda_1$ on the input surface of the prism, $\theta_{3\lambda 1}$ is the angle of incidence of the beam at reference wavelength $\lambda_1$ at the output surface of the prism, as measured from the output surface normal, $\theta_{4\lambda 1}$ is the output angle of the beam at reference wavelength $\lambda_1$ at the output surface of the prism, as measured from the output surface normal, and $\theta_1$, $n_{\lambda 1}$, $\alpha$, d and $\lambda_1$ are as defined previously.

Equation (3) above is merely Snell's law for the case where the incidence angle $\theta_1$ does not vary with the wavelength of the incident beam. Equation (4) relates the angles of a beam transmitted within a triangular prism, as is evident from FIG. 2A. Equation (5) relates the incident angle and exit angle of a collimated beam that is diffracted by a diffraction grating.

The following Equations (6)-(8) are for the case where the wavelength of the incident beam changes from the reference wavelength $\lambda_1$ to the wavelength $\lambda_2$;

$$\sin\theta_1 = n_{\lambda 2}\sin\theta_{2\lambda 2} \quad \text{Equation (6)}$$

$$\theta_{3\lambda 2} = \theta_{2\lambda 2} - \alpha \quad \text{Equation (7)}$$

$$d(n_{\lambda 2}\sin\theta_{3\lambda 2} - \sin\theta_{4\lambda 2}) = \lambda_2 \quad \text{Equation (8)}$$

where $\theta_{2\lambda 2}$ is the angle of refraction of the beam at the input surface of the prism, after the change in wavelength of the source from $\lambda_1$ to $\lambda_2$, as measured from the input surface normal, $\theta_{3\lambda 2}$ is the angle of incidence of the beam at the output surface of the prism, after the change in wavelength of the source from $\lambda_1$ to $\lambda_2$, as measured from the output surface normal, $\theta_{4\lambda 2}$ is the output angle of the beam after the change in wavelength of the source from $\lambda_1$ to $\lambda_2$ at the output surface of the prism, as measured from the output surface normal, and $\theta_1$, $n_{\lambda 2}$, $\alpha$, d, and $\lambda_2$ are as defined previously.

Moreover, for the beam shaping prism to be achromatic, the following Equation (9) must be satisfied:

$$\theta_{4\lambda 1} = \theta_{4\lambda 2} \quad \text{Equation (9)}$$

where $\theta_{4\lambda 1}$ and $\theta_{4\lambda 2}$ are as defined above.

If the difference between Equation (5) and Equation (8) is expressed in terms of the incidence angle $\theta_1$ using the above Equations (3)-(9), it becomes the above Equation (1). Furthermore, the aforesaid beam shaping factor $\beta$ is expressed as $\beta = A/a = (\cos\theta_2 \cos\theta_4)/(\cos\theta_1 \cos\theta_3)$ by using the angles $\theta_1$ to $\theta_4$ shown in FIG. 2A.

The above Equation (2) is derived in roughly the same manner as that of Equation (1). Thus, a detailed description will be omitted. By satisfying Equation (2) the beam shaping prism is made achromatic so that substantially no fluctuation of the angle of the output beam occurs even though the wavelength of the incident beam fluctuates. In this way, the beam shaping prisms shown in FIGS. 1A and 1B are made substantially achromatic. By providing both of these properties, the achromatic beam shaping prism of the present invention enables costs to be reduced and for the beam shaping systems to be miniaturized.

Embodiments 1–4 of the achromatic beam shaping prism of present invention are illustrated in FIGS. 1A, 3, 4 and 5, respectively. In each of these Embodiments 1–4, all of the incident beams are initially at the reference wavelength $\lambda_1 = 650$ nm, and the wavelength after the change in wavelength of the light source is $\lambda_2 = 660$ nm. Moreover, in Embodiments 1–4, a beam shaping factor $\beta$ is taken as 2.5 times. This value is used because a factor $\beta$ in the range of 2–3 is generally needed to satisfactorily shape the luminous intensity distribution of a semiconductor laser source for optical discs.

Various embodiments of the invention, all with a diffraction grating that satisfies Equation (1) that is applied to the output surface of a prism, will now be given in detail.

Embodiment 1

FIG. 1A is a diagram showing an achromatic beam shaping prism according to a first species of Embodiment 1. This achromatic beam shaping prism 1 has the following parameters:

$n_{\lambda 1} = 1.514521$ $n_{\lambda 2} = 1.514207$ $\theta_1 = 71.86°$ $\alpha = 38.25°$ where $n_{\lambda 1}$, $n_{\lambda 2}$, $\theta_1$ and $\alpha$ are as defined above.

Moreover, in this achromatic beam shaping prism 1, a diffraction grating satisfying the above Equation (1) is formed on the output surface 3. Namely, the pitch d of this diffraction grating is taken as 40.05 $\mu$m.

In the present embodiment, the output angle $\theta_4$ from the prism 1 is taken as 0.0°. Namely, the present embodiment is an example in which $\theta_4$ ($=\theta_{4\lambda 1}=\theta_{4\lambda 2}$) used in the description of the above Equation (1) is taken as 0.0 degrees.

Embodiment 2

Figure 3:
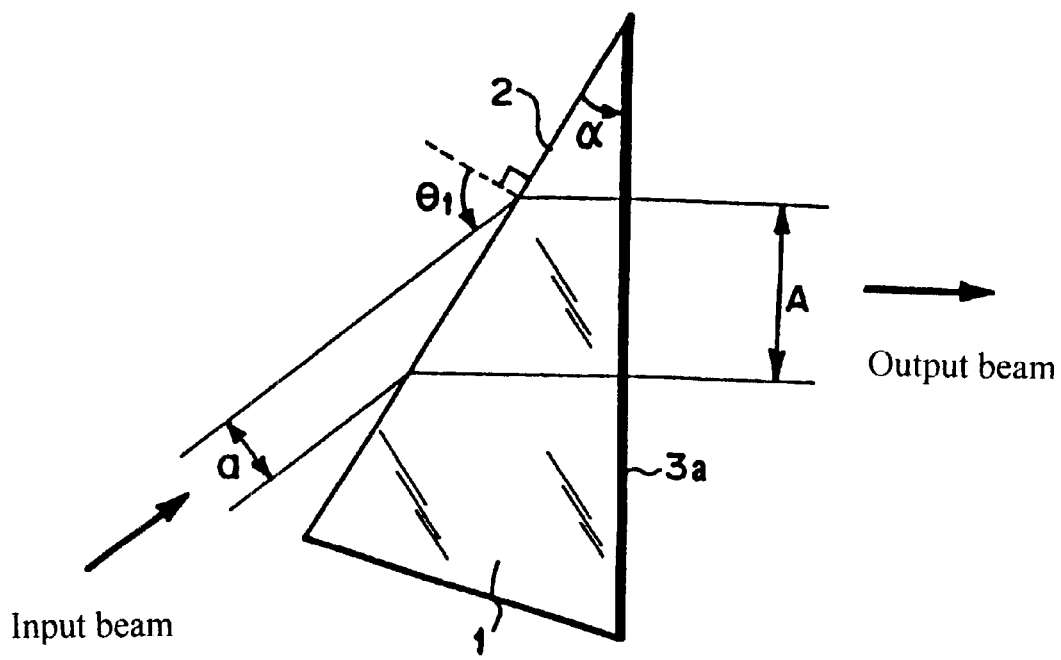
FIG. 3 is a side view of an achromatic beam shaping prism according to Embodiment 2.

FIG. 3 shows an achromatic beam shaping prism according to Embodiment 2. This achromatic beam shaping prism 1 has the following parameters:

$n_{\lambda 1} = 1.776646$ $n_{\lambda 2} = 1.775578$ $\theta_1 = 70.17°$ $\alpha = 30.63°$ where $n_{\lambda 1}$, $n_{\lambda 2}$, $\theta_1$ and $\alpha$ are as defined above.

In this achromatic beam shaping prism 1, a diffraction grating satisfying the above Equation (1) is formed on an output surface 3a. Namely, the pitch of this diffraction grating is taken as 15.59 $\mu$m.

As in the first embodiment, the output angle $\theta_4$ from the prism 1 in this embodiment is 0.0 degrees.

Embodiment 3

Figure 4:
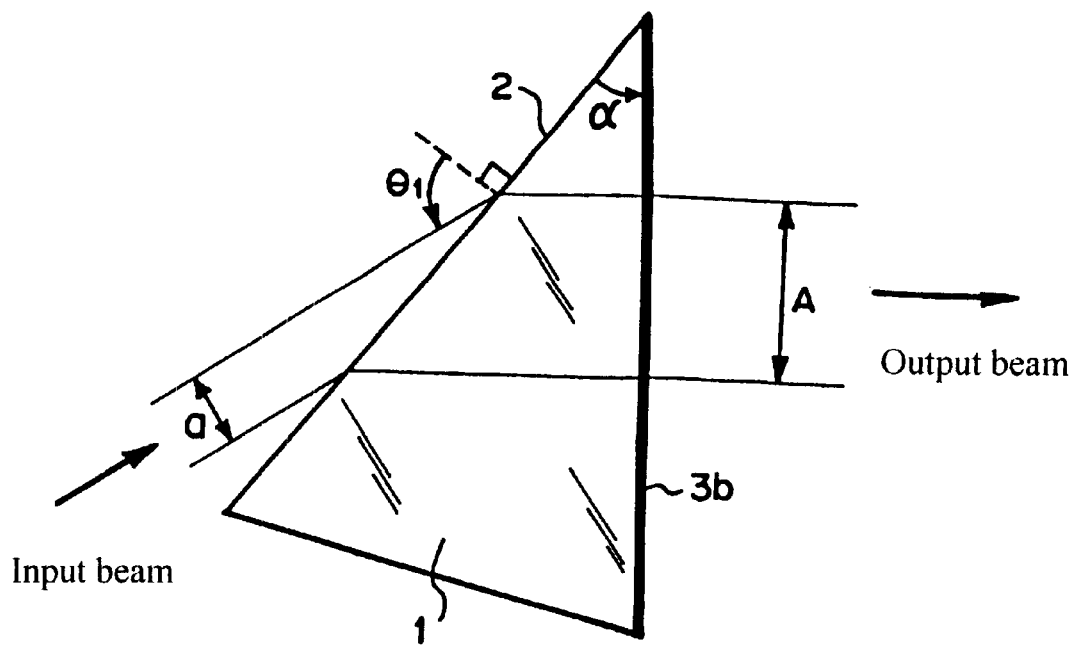
FIG. 4 is a side view of an achromatic beam shaping prism according to Embodiment 3.

FIG. 4 shows an achromatic beam shaping prism according to Embodiment 3. This achromatic beam shaping prism 1 has the following parameters:

$n_{\lambda 1} = 1.514521$ $n_{\lambda 2} = 1.514207$ $\theta_1 = 71.85°$ $\alpha = 38.86°$ where $n_{\lambda 1}$, $n_{\lambda 2}$, $\theta_1$ and $\alpha$ are as defined above.

In this achromatic beam shaping prism 1, a diffraction grating satisfying the above Equation (1) is formed on an output surface 3b. Namely, the pitch of this diffraction grating is taken as 39.52 $\mu$m.

In the present embodiment, the output angle $\theta_4$ from the prism 1 is taken as $-0.9°$. In other words, in the present embodiment, $\lambda_4$ ($=\theta_{4\lambda 1}=\theta_{4\lambda 2}$) used in the description of the above Equation (1) is taken as $-0.9°$.

Embodiment 4

Figure 5:
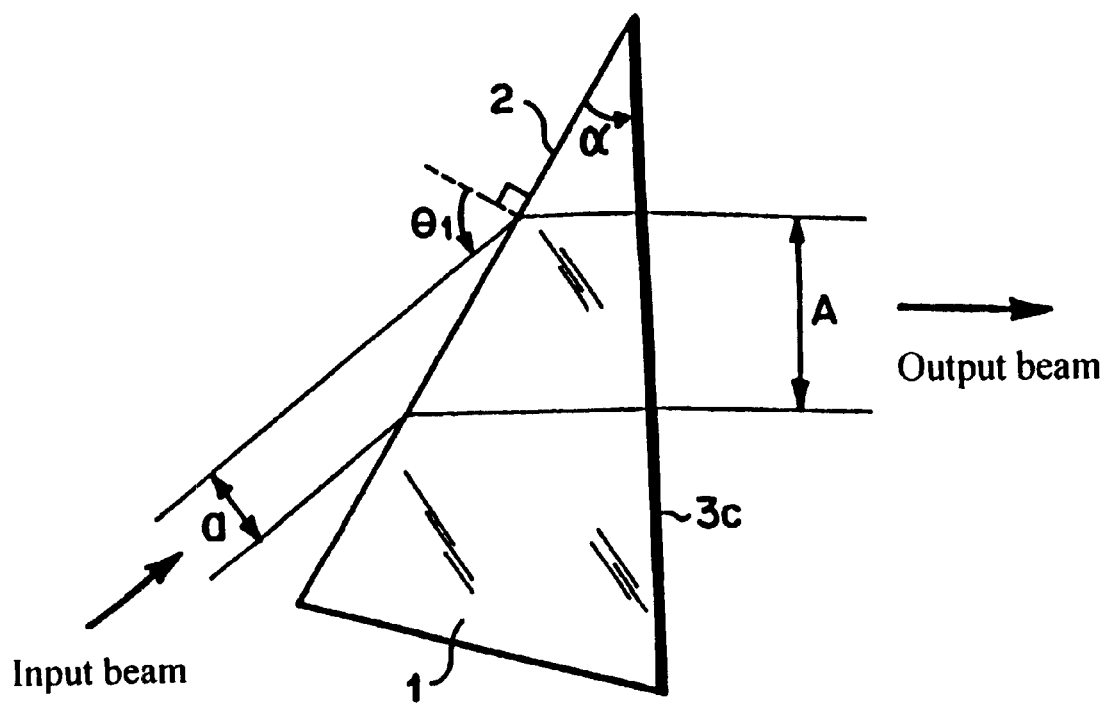
FIG. 5 is a side view of an achromatic beam shaping prism according to Embodiment 4.

FIG. 5 shows an achromatic beam shaping prism according to Embodiment 4. This achromatic beam shaping prism 1 has the following parameters:

$n_{\lambda 1} = 1.776646$ $n_{\lambda 2} = 1.775578$ $\theta_1 = 70.16°$ $\alpha = 31.97°$ where $n_{\lambda 1}$, $n_{\lambda 2}$, $\theta_1$ and $\alpha$ are as defined above.

In this achromatic beam shaping prism 1, a diffraction grating satisfying the above Equation (1) is formed on an output surface 3c. Namely, the pitch d of this diffraction grating is taken as 15.00 μm.

In the present embodiment, the output angle from the prism 1 is taken as −2.5 degrees. In other words, in the present embodiment, $\theta_4$ ($=\theta_{4\lambda 1}=\theta_{4\lambda 2}$) used in the description of the above Equation (1) is taken as −2.5 degrees.

As described above, this invention provides a beam shaping prism of simple construction which is made to be achromatic in order to correct for fluctuations of the oscillating wavelength of a semiconductor laser source by including a diffraction grating on either the input surface or the output surface of the prism, with the diffraction grating having a different specified pitch depending on whether the diffraction grating is applied to the output surface or the input surface of the prism.

The invention being thus described, it will be obvious that the same may be varied in many ways. For example, the incident angle $\theta_1$ and/or the apex angle $\alpha$ of the prism can be readily changed, thereby providing an arbitrary beam shaping factor. Furthermore, the cross-sectional shape of the diffraction grating portion may be any shape, such as rectangular, stepwise, zigzag and so on. If the utilization efficiency of light is considered, however, a zigzag or stepwise cross-sectional shape is preferable. It is also possible for each of Embodiments 2–4 to have the diffraction grating at the input plane of the prism, as in the second species of Embodiment 1 (i.e., as illustrated in FIG. 1B). Also a diffraction grating can be formed on both the input side and output side of the prism, in which case effects similar to those described in the given embodiments can also be obtained. Further, although the above embodiments are described in terms of responding to changes of the oscillating wavelength of a semiconductor laser source, these embodiments can also be used with any light beams containing two wavelengths. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An achromatic beam-shaping prism, which converts the cross section of a beam incident onto an input surface by a given factor in a specific direction, thereby providing a beam shaping function to a beam output from an output surface of the prism, said achromatic beam shaping prism comprising:

a single prism in which a diffraction grating having a pitch d' which satisfies the following Equation (2) is formed on an input surface of the prism $$d'[n_{\lambda 2} \sin\{\sin^{-1}(\sin\theta_4/n_{\lambda 2})+\alpha\} - n_{\lambda 1}\sin\{\sin^{-1}(\sin\theta_4/n_{\lambda 1})+\alpha\}] = \lambda_1 - \lambda_2 \quad \text{Equation (2)}$$

where d' is the pitch of the diffraction grating at the input surface of the prism, $\lambda_1$ is the reference wavelength of the incident beam, $\lambda_2$ is the wavelength of the incident beam after the change in wavelength of the light source from the reference wavelength, $n_{\lambda 1}$ is the index of refraction of the prism at wavelength $\lambda_1$, $n_{\lambda 2}$ is the index of refraction of the prism at wavelength $\lambda_2$, $\theta_4$ is the angle the output beam makes with the surface normal to the output surface of the prism, and $\alpha$ is the apex angle of the prism.

* * * * *

UNITED STATES PATENT AND TRADEMARK OFFICE
CERTIFICATE OF CORRECTION

PATENT NO. : 6,552,851 B2
DATED : April 22, 2003
INVENTOR(S) : Katsuma

It is certified that error appears in the above-identified patent and that said Letters Patent is hereby corrected as shown below:

Column 1,
Line 38, change "different, refractive" to -- different refractive --.

Column 4,
Line 2, change "--- A ¯" to -- A --;

Column 5,
Line 14, change "wavelength $\lambda_2$;" to -- wavelength $\lambda_2$: --; and Column 6,
Line 58, change "$\lambda_4$ (= $\theta_{4\lambda1}$ = $\theta_{4\lambda2}$)" to -- $\theta_4$ (= $\theta_{4\lambda1}$ = $\theta_{4\lambda2}$) --.

Signed and Sealed this

Second Day of September, 2003

JAMES E. ROGAN
*Director of the United States Patent and Trademark Office*